United States Patent
Arcand

(10) Patent No.: US 7,395,526 B2
(45) Date of Patent: Jul. 1, 2008

(54) METHOD AND SYSTEM FOR MANAGING APPLICATION SERVER LIFECYCLE

(75) Inventor: Jean-Francois Arcand, Prevost (CA)

(73) Assignee: Sun Microsystems, Inc., Santa Clara, CA (US)

(*) Notice: Subject to any disclaimer, the term of this patent is extended or adjusted under 35 U.S.C. 154(b) by 589 days.

(21) Appl. No.: 10/328,883

(22) Filed: Dec. 23, 2002

(65) Prior Publication Data

US 2004/0122928 A1 Jun. 24, 2004

(51) Int. Cl.
*G06F 9/44* (2006.01)
(52) U.S. Cl. ........................ 717/127; 714/38
(58) Field of Classification Search ......... 717/124–135; 709/201–224; 714/38
See application file for complete search history.

(56) References Cited

U.S. PATENT DOCUMENTS

| | | | | |
|---|---|---|---|---|
| 5,671,351 | A * | 9/1997 | Wild et al. | 395/183 |
| 6,044,398 | A * | 3/2000 | Marullo et al. | 709/219 |
| 6,157,940 | A * | 12/2000 | Marullo et al. | 703/27 |
| 6,473,794 | B1 * | 10/2002 | Guheen et al. | 709/223 |
| 6,615,166 | B1 * | 9/2003 | Guheen et al. | 703/27 |
| 6,701,514 | B1 * | 3/2004 | Haswell et al. | 717/115 |
| 6,823,478 | B1 * | 11/2004 | Prologo et al. | 714/38 |
| 7,206,827 | B2 * | 4/2007 | Viswanath et al. | 709/220 |
| 2001/0012986 | A1 * | 8/2001 | Conan et al. | 702/188 |
| 2004/0019670 | A1 * | 1/2004 | Viswanath | 709/223 |

OTHER PUBLICATIONS

Nusbaum et al., WebSphere Application Servers:Standard and Advanced Editions, Jul. 1999, IBM, first edition. http://www.redbooks.ibm.com/redbooks/pdfs/sg245460.pdf.*
Picon et al., Enterprise JavaBean Development using VisualAge for Java, Jun. 1999, IBM, first edition. http://redbooks.ibm.com/redbooks/pdfs/sg24529.pdf.*
"WebSphere Aplication Servers: Standard and Advanced Editions", IBM, Barry Nusbaum et al, International Technical Support Organization, SG24-5460-00, Whole Manual, Jul. 1999.*
"Focus on OpenView A Guide Hewlett-Packard's Network and Systems Management Platform", Nathan J. Muller, Mar. 1995, Whole Manual.*
"Got ODBC Clients Bugging You?", Systems Software Technology's TracePlus/ODBC 2.20 debugger, Scott Schoen, Jan. 1997, Abstract, 1 page.*
Software-Analysis Tools Improve Embedded Reliability, William Wong, Product Annoucement, May 21, 2001, Abstract, 1 page.*
"Focus on Open View A Guide to Hewlett-Packard's Network and Systems Management Platform", Nathan J. Muller, Mar. 1995, Whole Manual.*
Running MS DOS , Van Wolverton, p. 4, 1993.*

* cited by examiner

*Primary Examiner*—Todd Ingberg
(74) *Attorney, Agent, or Firm*—Martine Penilla & Gencarella, LLP

(57) ABSTRACT

A method for managing an application server that is configured to execute a plurality of test applications is provided. The method includes the operations of (a) processing a first one of the plurality of test applications, (b) determining if the first application fails to be processed to completion, (c) recording an exception identifying an explanation for the failure if the first test application fails to be processed to completion, (d) refreshing the application server, (e) executing a next one of the plurality of test applications, and (f) repeating operations (a) through (e) if there are remaining ones of the plurality of test applications that still need to be processed.

20 Claims, 13 Drawing Sheets

METHOD AND SYSTEM FOR MANAGING APPLICATION SERVER LIFECYCLE

BACKGROUND OF THE INVENTION

1. Field of the Invention

The present invention relates generally to computer software testing, and more particularly, to methods and systems for managing an application server running a plurality of test applications.

2. Description of the Related Art

As the use of computer software in performing daily tasks is increasing rapidly, assessing software reliability through software testing has become an imperative stage in the software development cycle. As is well known, software testing is directed toward eliminating defects (i.e., bugs) in computer software, which if undetected, can create significant negative results.

As is well known, multiple groups of developers are involved during computer software application development, with each group being responsible for developing a certain portion of the application source code (i.e., a workspace). Each group is further responsible to ensure that its workspace functions properly. In achieving this task, different test applications are created to specifically test each portion of the application.

Typically, the test applications are run on the server application designed to execute the software application. The test applications are commonly submitted to the application server manually, which depending on preference, are processed serially or in parallel. Successfully processed test applications are marked as having a "pass" test result while unsuccessfully processed test applications, are marked as having a "fail" test result. A fail test result maybe generated as a result of detecting a bug in the software application being tested, in the application server processing the software application being tested, or in the test applications testing the software application.

By way of example, where test applications are processed in series, unsuccessful processing of a test application, for any reason, terminates the execution of all succeeding test applications. As a result, the generated test execution report includes a corresponding fail test result for the failed test application as well as all the succeeding test applications. Alternatively, where the test applications are being run in parallel, failure in processing one of test applications, terminates the execution of the test application, generating a test execution report that contains fail results for all of the test applications being run.

In either scenario, the generated test report includes an entry for each test application submitted for processing. That is, the test report has a corresponding pass or fail result entry for each test application fully processed. The test report further includes a corresponding fail result entry for improperly terminated test application as well as all test applications being run in parallel or subsequent to the terminated test application. Thus, one reviewing the generated test report cannot determine whether the test application failure was proper (i.e., due to a bug in the application being tested, the application server, or the test applications testing the software application) or improper (i.e., resulting from succeeding an improperly terminated test application being run concurrently with a improperly terminated test application).

Additionally, generating a complete and comprehensive test report containing results of all the test applications is impossible when the application server or network communication is down. In such scenarios, a typical test report contains a corresponding entry for each test application fully processed during the period the application server or network was functioning. However, the test report either does not include an entry for the remaining test applications or the corresponding result entries in the test report are solely failures. Again, one reviewing the test results cannot determine whether the failure of such test applications was due to a bug in the application being tested, a bug in the application server, or a bug in the test application.

In view of the foregoing, there is a need for a flexible methodology and system for managing the lifecycle of an application server running a software application being tested by a plurality of test applications.

SUMMARY OF THE INVENTION

Broadly speaking, the present invention fills these needs by providing an application server lifecycle manager to manage and monitor a lifecycle of an application server executing a software application being tested by a plurality of test applications. In one embodiment, the application server is a Java 2 Platform, Enterprise Edition (J2EE) application server processing a deployed J2EE application being tested by a plurality of test applications. It should be appreciated that the present invention can be implemented in numerous ways, including as a process, an apparatus, a system, a device, or a method. Several inventive embodiments of the present invention are described below.

In one embodiment, a method for managing an application server that is configured to execute a plurality of test applications is provided. The method includes the operations of (a) processing a first one of the plurality of test applications, (b) determining if the first application fails to be processed to completion, (c) recording an exception identifying an explanation for the failure if the first test application fails to be processed to completion, (d) refreshing the application server, (e) executing a next one of the plurality of test applications, and (f) repeating operations (a) through (e) if there are remaining ones of the plurality of test applications that still need to be processed.

In another embodiment, a method for managing an application server that is configured to execute a plurality of test applications is provided. The method includes the operations of (a) processing a first one of the plurality of test applications, (b) determining if the first application fails to be processed to completion for a predetermined period of time, (c) if the first test application fails to be processed to completion for the predetermined period of time, refreshing the application server, (d) recording an exception identifying an explanation for the failure, (e) executing a next one of the plurality of test applications, and (f) repeating the operations of (a) through (e) if there are remaining ones of the plurality of test applications that still need to be processed.

In yet another embodiment, a method for managing an application server that is configured to execute a plurality of test applications is provided. The method includes the operations of (a) refreshing the application server, (b) processing a first one of the plurality of test applications, (c) recording a pass explanation if the processing of the first one of the plurality of test applications proceeds to completion, (d) recording a fail explanation if the processing of the first one of the plurality of test applications fails to proceed to completion, (e) executing a next one of the plurality of test applications, and (f) repeating operations (a) through (e) if there are remaining ones of the plurality of test applications that still need to be processed.

In still another embodiment, a method for managing an application server that is configured to execute a plurality of test applications is provided. The method includes the operations of (a) processing a first one of the plurality of test applications; (b) recording a pass explanation if the processing of the first one of the plurality of test applications proceeds to completion, (c) recording a fail explanation if the processing of the first one of the plurality of test applications fails to proceed to completion, (d) refreshing the application server, (e) executing a next one of the plurality of test applications, and (f) repeating the operations of (a) through (e) if there are remaining ones of the plurality of test applications that still need to be processed.

In yet another embodiment, a method for managing an application server that is configured to execute a plurality of test applications in parallel is provided. The method includes building a plurality of test applications in parallel and deploying the plurality of test applications in parallel. The method also includes recording an exception if a test application of the plurality of test applications fails to deploy successfully. Also included are shutting down the application server and restarting the application server. Further included in the method is running the plurality of test applications in parallel.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIGS. 3A-1 is a simplified block diagram depicting the processing of a plurality of test applications serially implementing an exemplary script, in accordance with another embodiment of the present invention.

FIGS. 3A-2 is a simplified block diagram depicting the processing of a plurality of test applications serially implementing an exemplary script, in accordance with another embodiment of the present invention.

FIGS. 3A-3 is a simplified block diagram depicting the processing of a plurality of test applications serially implementing an exemplary script, in accordance with another embodiment of the present invention.

FIGS. 3B-1 is a simplified schematic diagram illustrating in series processing of a plurality of test applications utilizing an exemplary script, in accordance with another embodiment of the present invention.

FIGS. 3B-2 is a simplified schematic diagram illustrating in series processing of a plurality of test applications utilizing an exemplary script, in accordance with another embodiment of the present invention.

DETAILED DESCRIPTION OF THE PREFERRED EMBODIMENTS

Figure 1:
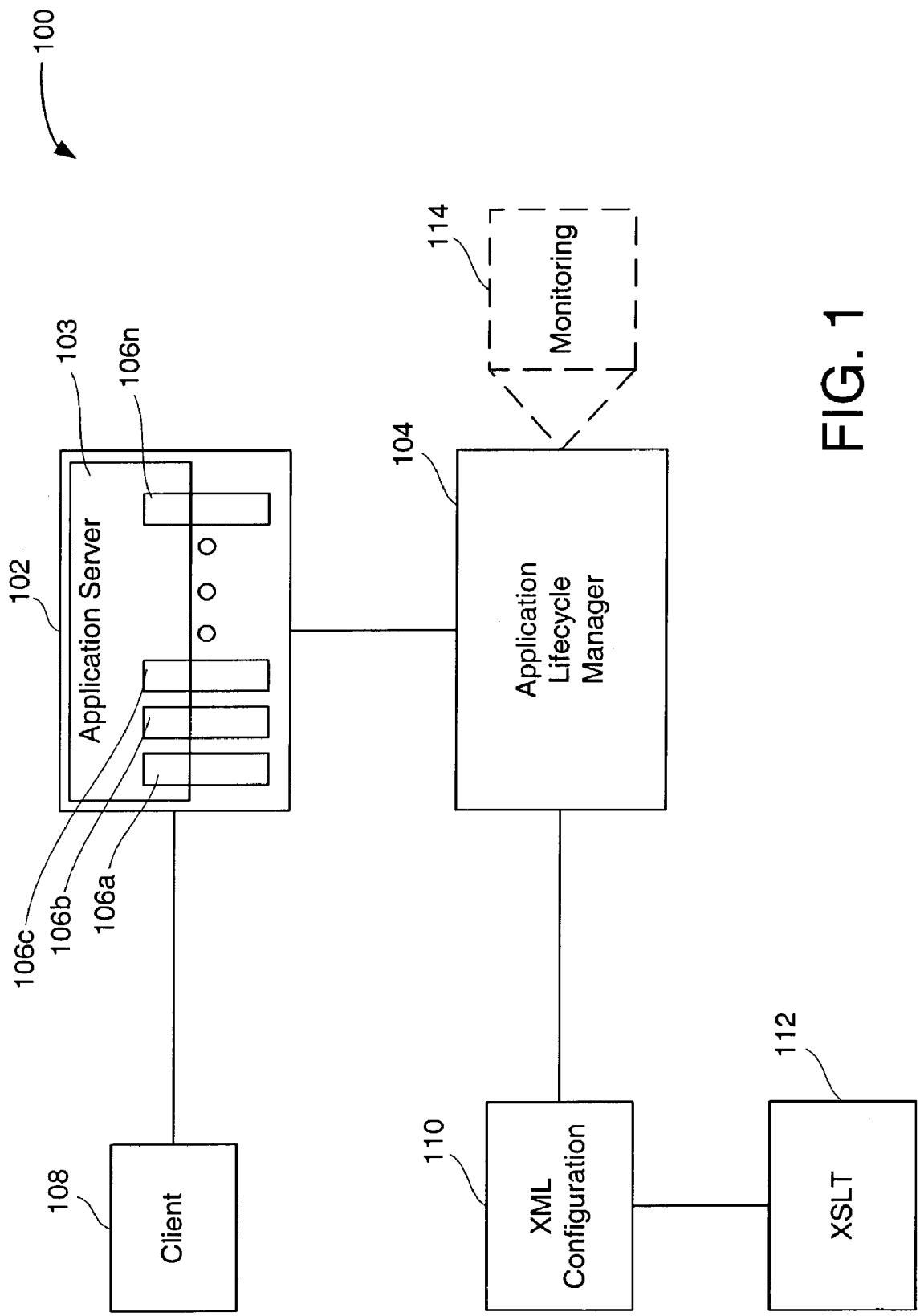
FIG. 1 is a simplified schematic diagram illustrating the monitoring and managing of an application server processing an application, in accordance with one embodiment of the present invention.

Inventions for an application lifecycle manger to monitor and manage a lifecycle of an application server executing a software application being tested by a plurality of test applications are provided. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

In one embodiment, the application lifecycle manager implements a plurality of scripts (herein also referred to as scenarios) to process a plurality of test applications testing the software application being executed by the application server. In one implementation, the scripts are stored to Extensible Markup Language (XML) files. In one embodiment, the application lifecycle manger monitors the application server by starting/stopping the application server, initiating/terminating processing of the application on the application server, initiating/terminating processing of the test applications, restarting the application server when a fatal error occurs, launching the application server, installing an application on the application server, pinging the application server, etc.

In one embodiment, the application server lifecycle manager implements the script whereby the application server is shut down and restarted prior to deploying a test case into the application server for execution. In another example, using the script, the application server is shut down and restarted once it has been determined that the application server has hung greater than a predefined period of time while deploying or running a test application.

As embodiments of the present invention implement the Enterprise JavaBeans (EJB) application, a brief introduction to EJB architecture is provided below. EJB is part of a larger overall technology known as the Java 2 Platform, Enterprise Edition (J2EE) developed by Sun Microsystems, Inc. J2EE provides architecture for developing, deploying, and executing applications in a distributed-object environment.

Summarily, EJB architecture promotes the creation of reusable server-side behaviors or instructions in the Java language, connectors to enable access to existing enterprise systems, and easy-to-deploy program modules. The EJB architecture creates a collaborative architecture to provide services virtually anywhere, and for a wide range of customers and devices.

The EJB architecture defines a model for the development and deployment of reusable Java server components called EJB components. As designed, the EJB component is a non-visible server component having methods that provide business logic in a distributed application. In one example, the EJB architecture includes the EJB client and the EJB server. The EJB client is configured to provide the user-interface logic on a client machine and to make calls to remote EJB components on a server. For instance, the EJB client is provided the information as to how to find the EJB server and how to interact with the EJB components.

In one example, the EJB client does not communicate directly with the EJB component. In one aspect, the EJB container provides the client proxy objects that implement the home and remote interfaces of the component. In one example, the remote interface is configured to define the business methods that can be called by the client. In another embodiment, the client is configured to invoke the methods resulting in the updating of the database. Thus, the EJB beans are reusable components that can be accessed by client programs. The application programmer codes the business logic into the EJBs and deploys them into a J2EE compliant server. In one example, the server complying with the J2EE specification provides the required system-level services, thus allowing the application programmer to concentrate on business logic.

The EJB server (i.e., the EJB application) includes an EJB container, which in one example provides the services required by the EJB component. For instance, the EJB container may be configured to include one of an EJB home interface or EJB Remote interface and EJB beans. In one embodiment, the EJB home interface and the EJB remote interface are defined in the same Java virtual machine. In a different embodiment, the EJB home interface and the EJB remote interface may be defined on different Java virtual machines or separate physical computers.

In one example, the EJB specification defines a container as the environment in which one or more EJB components execute. In accordance to one example, the EJB container provides the infrastructure required to run distributed components thus allowing the clients and component developers to focus on programming business logic. Simply stated, the container manages the low-level communications between the clients and the EJB beans. In one example, once an EJB bean is created by a client, the client invokes methods on the EJB bean as if the EJB beans were running in the same virtual machine as the client.

Furthermore, the clients are unaware of activities on the EJB bean, since the container is configured to sit between the clients and the EJB beans. For instance, if an EJB bean is passivated, its remote reference on the client remains intact. Thus, when the client later invokes a method on the remote reference, the container activates the EJB bean to service the request.

The EJB container encapsulates:

The client runtime and generated sub classes. In one example, this allows the client to execute components on a remote server as if the components were local objects.

The naming service allows the clients to instantiate components by name. It further allows components to obtain resources (e.g., database connections, etc.) by name.

The EJB server component dispatcher, which in one example, executes the component's implementation class and provides services such as transaction management, database connection pooling, and instance life-cycle management.

In one example, three types of EJB components can be enumerated.

Stateful session Beans: A stateful session bean manages complex processes or tasks that require the accumulation of data. They further manage tasks that require more than one method call to complete but are relatively short lived, store session state information in class instance data, and have an affinity between each instance and one client from the time the client creates the instance until it is destroyed by the client or by the server.

Stateless session Beans: A stateless session bean manages tasks that do not require the keeping of client session data between method calls. Furthermore, the method invocation by a stateless session bean does not depend on data stored by previous method invocations, there is no affinity between a component instance and a particular client, and different instances of the stateless session beans are seemed identical to the client.

Entity Beans: An entity bean model is a business model that is a real-world object which methods are run on the server machine. When the entity bean method is called, the program's thread stops executing and control is passed to the server. When the method returns from the server, the local thread resumes executing. In one example, the entity beans have the following characteristics: Each instance represents a row in a persistent database relation (e.g., a table, view, etc.); and The bean has a primary key that corresponds to the database relation's key which is represented by a Java data type or class.

Each EJB component further has a transaction attribute configured to determine the manner the instances of the component participate in transactions. As designed, the EJB container provides services which can include transaction and persistence support to the EJB components. As to the transaction support, the EJB container is configured to support transactions. In one example, when the bean is deployed, the EJB container provides the necessary transaction support. In regard to the persistence support, the EJB container is configured to provide support for persistence of the EJB components, which in one embodiment, is defined as the capability of the EJB component to save and retrieve its state. In this manner, the EJB component does not have to be re-created with each use.

In one example, the EJB architecture is a three-tiered architecture in which the clients reside on the first tier, the application server and the components (i.e., EJB beans) reside on the second tier, and the databases reside on the same host as the EJB server. In accordance to one implementation, the EJB server executes methods on a component from the client or another component, retrieves data from databases, and performs other communications. The EJB server further handles the details of transactions, threads, security, database connections, and network communication. Summarily, the EJB clients request business-logic services from EJB beans running on the second-tier. The EJB beans then use the system services provided by the second-tier server to access data from existing systems in the third tier. The EJB beans apply the business rules to the data, and return the results to the clients in the first-tier.

In one example, the client contains the user interface. The business logic is configured to be separate from both the clients and the databases and resides in the same tier (i.e., second tier) as components that analyze data, perform computations, or retrieve information from data sources and processes.

As EJB implements the Java™ (hereinafter "Java") programming language, in a like manner, an overview of Java is provided below. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium and large, without modification. Developed by Sun, Java has been promoted and geared heavily for the Web, both for public Web sites and Intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "byte code". The byte code is then converted (interpreted) into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Keeping this brief overview to Enterprise Java Beans and Java in mind, reference is made to FIG. 1 illustrating the monitoring and managing of an application server 102 processing an application 103, in accordance with one embodiment of the present invention. As shown, an application lifecycle manger 104 manages the processing of the application 103, as the application 103 is being tested by a plurality of test applications $106a\text{-}106_n$. The client 108 is configured to invoke remote methods on the EJBs. The application lifecycle manger 104 uses a script provided in an Extensible Markup Language (XML) file defined in an XML configuration component 110. In one example, the XML configuration 110 includes an XML file containing the script for processing each of the test applications $106a\text{-}106_n$. In one implementation, Extensible Stylesheet Language (XSLT) Stylesheet 112 is implemented to transform the XML file into a Hyper Text Markup Language (HTML) document for viewing.

The application lifecycle manger 104 monitors the application server using 114. In one embodiment, the application lifecycle manger 104 is configured to start/stop the application server 102, initiate/terminate processing of the application 103 on the application server 102, initiate/terminate processing of the test applications $106a\text{-}106_n$, restart the application server 102 when a fatal error occurs, launch the application server 102, install an application on the application server 102, ping the application server 102, etc. It must be noted by one having ordinary skill in the art that the Application lifecycle manger 104 of the present invention can be implemented to manage and monitor any application server (e.g., J2EE application server, reference implementation (RI), Iplanet, etc.).

Figure 2:
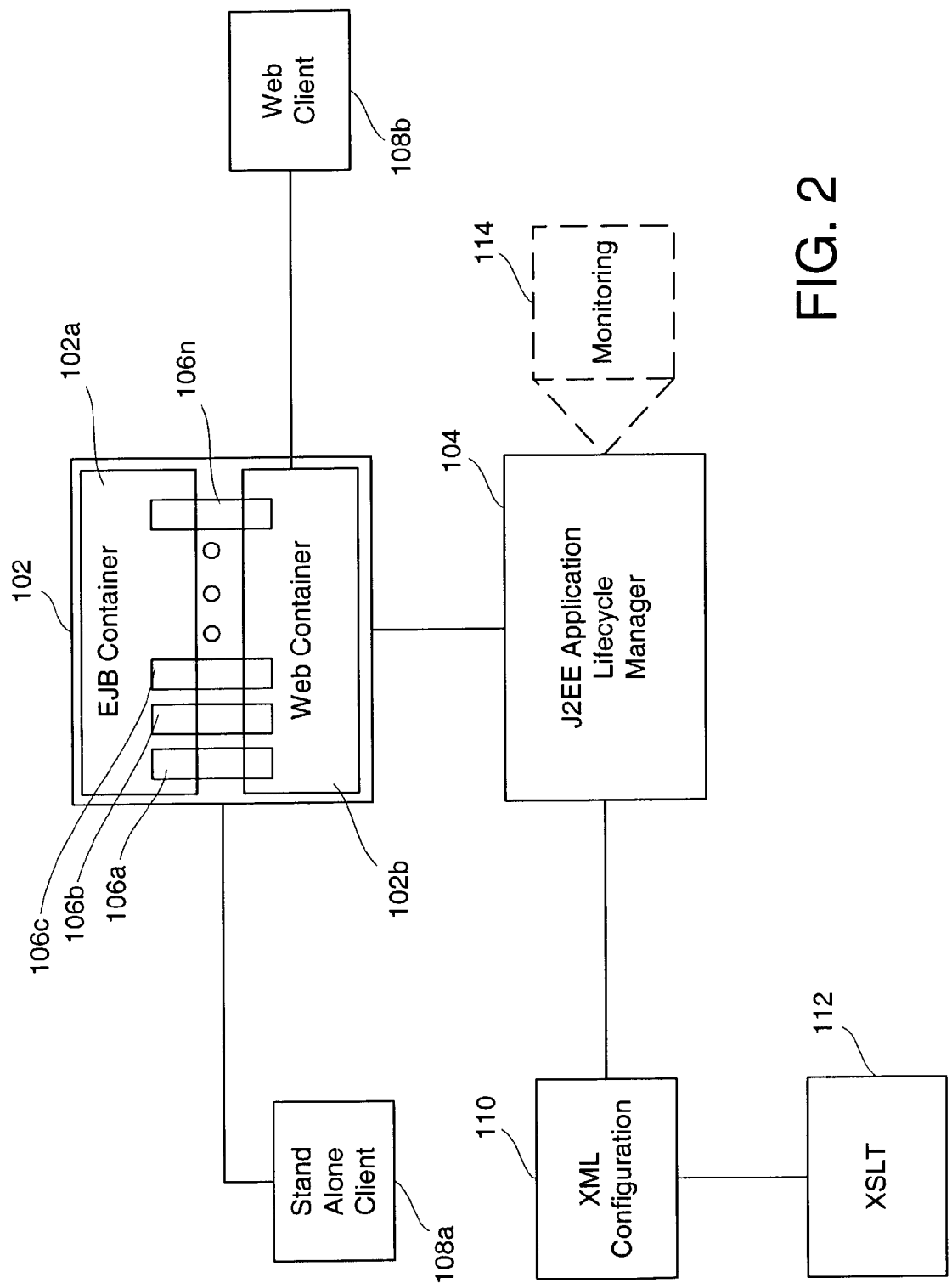
FIG. 2 is a simplified block diagram depicting the monitoring and managing of a J2EE application server by a J2EE application lifecycle manager, in accordance with another embodiment of the present invention.

Reference is made to the simplified block diagram of FIG. 2 depicting the monitoring and managing of a J2EE application server 102 by a J2EE application lifecycle manager 104, in accordance with one embodiment of the present invention. As shown, the J2EE application server 102 includes two applications, an EJB container 102a and a web container 102b. In accordance to one implementation, the EJB container 102a is a database that includes the relational operations while the web container 102b is a web page accessible with a browser (e.g., a graphical user interface (GUI), etc.).

As shown, a stand alone client 108a and a web client 108b have deployed a plurality of test applications $106a\text{-}106$, into the J2EE application server 102 to test the functionality of the EJB container 102a and web container 102b. In one embodiment, the stand alone client 108a be configured to deploy a few of the plurality of test applications $106a\text{-}106_n$ to test the functionality of the EJB container 102a while the web client 108b deploys the remainder of the plurality of test applications $106a\text{-}106_n$ to test the functionality of the web container 102b. In one exemplary embodiment, the test applications $106a\text{-}106_n$ are deployed to the application server 102 by the application 103.

The J2EE application lifecycle manger 104 monitors the J2EE application server 102 as shown in 114. In one implementation, the J2EE application lifecycle manger 104 is configured to start/stop the J2EE application server 102, initiate/terminate processing of the EJB container 102a or the web container 102b on the application server 102, initiate/terminate processing of the test applications $106a\text{-}106_n$, restart the J2EE application server 102 when a fatal error occurs, launch the J2EE application server 102, install an application on the J2EE application server 102, ping the J2EE application server 102, etc.

In accordance with one embodiment, the J2EE application lifecycle manger 104 implements an XML file defined in the XML configuration component 110. The XML file contains the script which the J2EE application lifecycle manager 104 will execute to test the EJB container 102a and 102b using the test applications $106a\text{-}106_n$. By way of example, the XML file may include the script in which the test application 106a is first built and then deployed into the J2EE application server 102. Thereafter, the test application 106a is run followed by generation of the test report. As will be discussed in more detail below with respect to FIGS. 3-4, the test applications $106a\text{-}106_n$ may be processed in series or in parallel.

Figures 1, 3A:
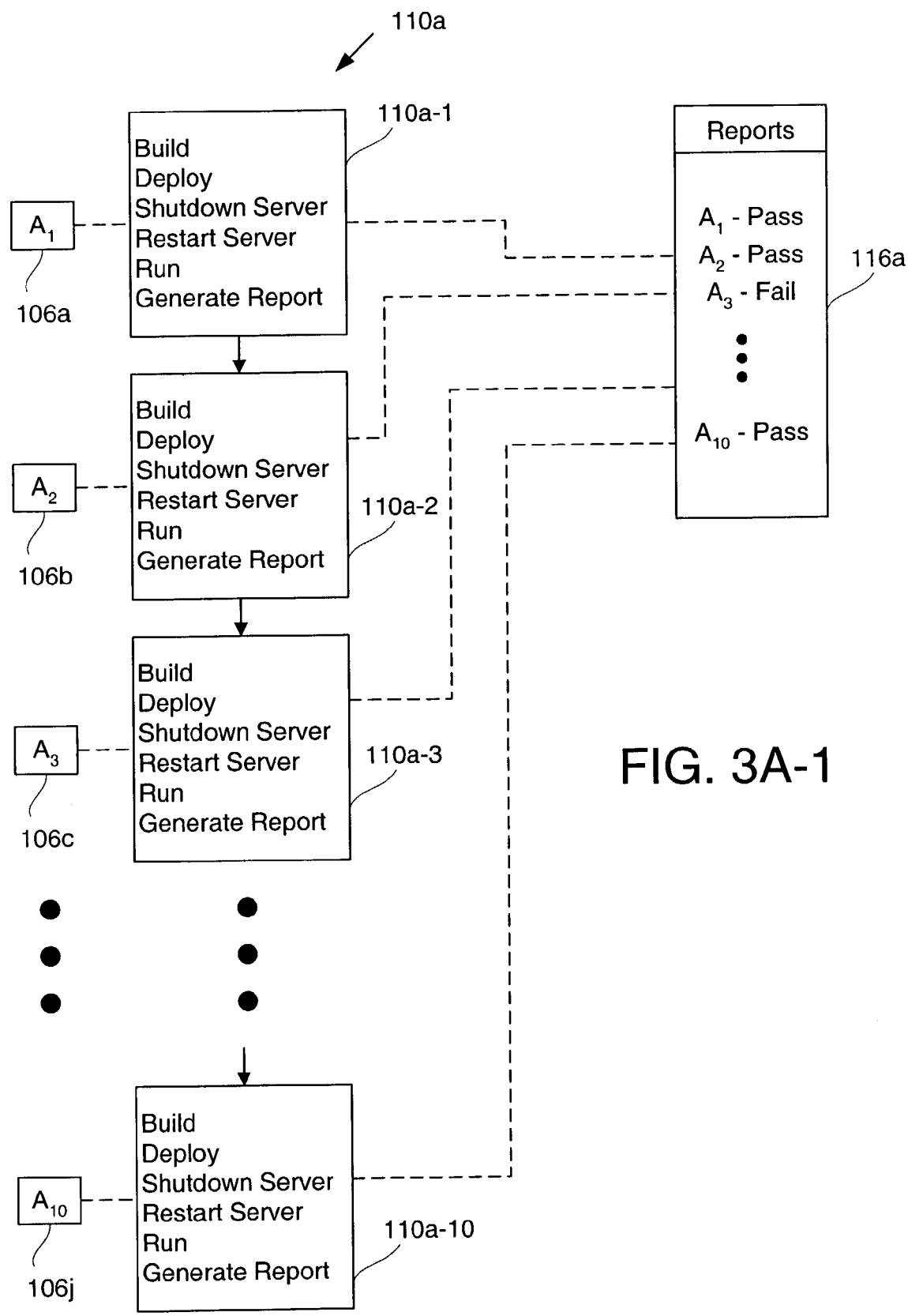
Figures 2, 3A:
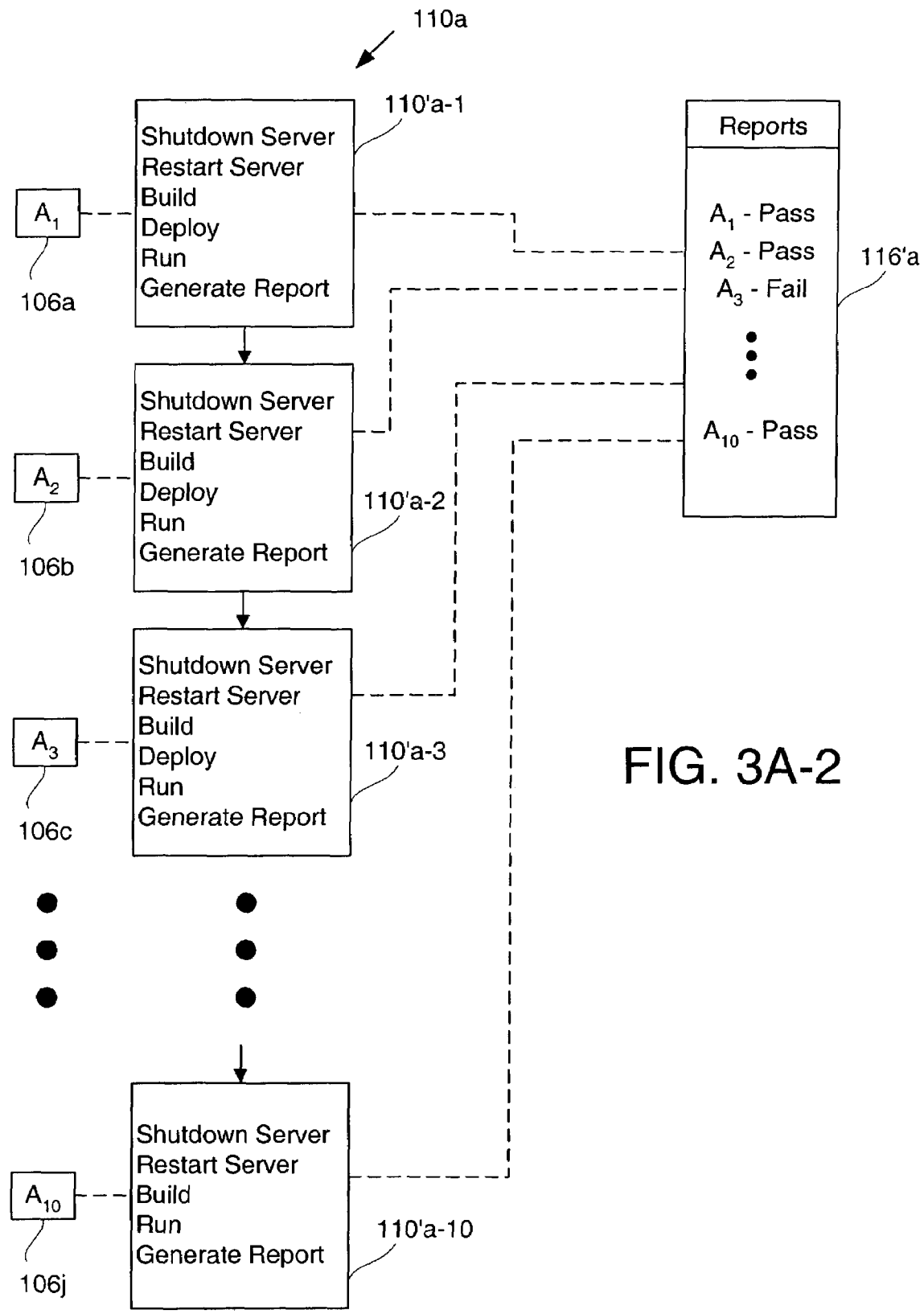
Figures 3, 3A:
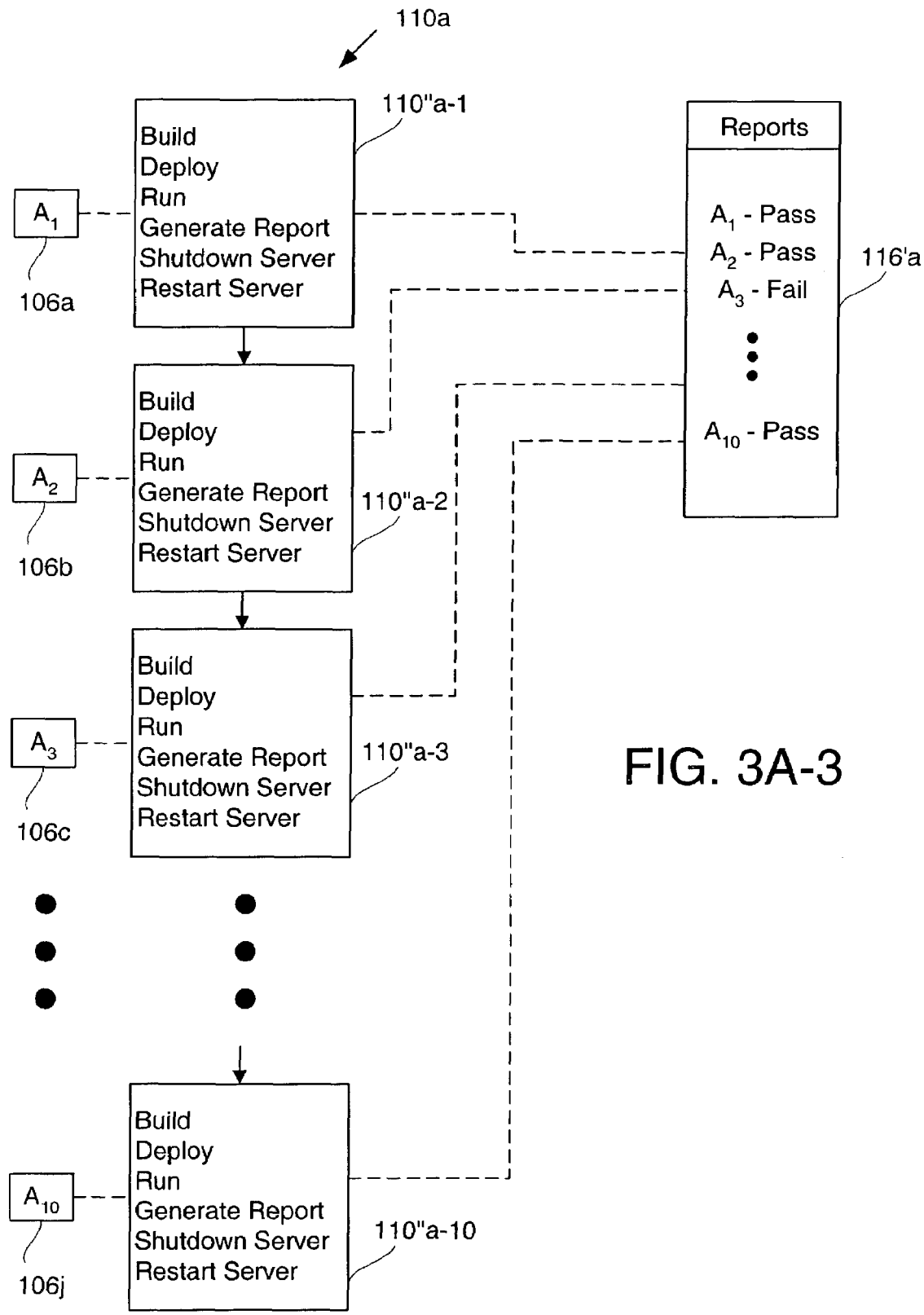

FIGS. 3A-1 through 3A-3 depict processing of a plurality of test applications 106a-106j, serially, respectively implementing exemplary scripts, in accordance with one embodiment of the present invention. As shown, the first test application 106a is shown to follow the script 110a-1 in which the first test application 106a is built and deployed into the J2EE application server. At this point, the J2EE application server is shut down followed by restarting of the J2EE application server. Then, the first test application 106a is run followed by generating of a report. As shown, a pass result entry for fully processed test application 106a is shown in the reports 116a.

After generating the test report for the first test application 106a, the J2EE application lifecycle manger 104 continues to process the subsequent test applications. In this example, the J2EE application lifecycle manager 104 uses the script 110a-2 to process the second test application 106b. According to the second scenario, the second test application 106b is built and deployed into the J2EE application server. At this point, the J2EE application server is shut down followed by restarting of the J2EE application server. Then, the second test application 106b is run followed by generating of a report. As shown, a pass result entry for fully processed test application 106a is shown in the reports 116a. Following the scenarios 110a-3 through 110a-10, third test application 106c through tenth test application 106j are respectively processed, generating corresponding reports shown in reports 116a.

As shown, the second test application 106b is shown to have been executed fully and successfully, thereby generating the pass result entry in the reports 116a while the third test application 106c and 106j are shown to have been unsuccessfully processed, as demonstrated by the fail entries in reports 116a. As can be appreciated, despite the occurrence of the fatal error during deployment of the third test application 106c, the J2EE application lifecycle manger 104 has continued to process the next in line test application, the fourth test application using a script substantially similar to the scripts 10a-2 and 110a-3. In this manner, processing of the test applications continues, serially, until the J2EE application lifecycle manager 104 reaches the last test application, the tenth test application 106j.

Thus, by using the exemplary scripts shown in 10a-1 through 110a-10, the J2EE application lifecycle manager 104 of the present invention is capable of limiting unwanted effects associated with improper and premature termination of a test application execution to that test application only. In this manner, the failure of a test application has no significant effect on processing the remaining test applications configured to be processed concurrently or subsequent to the prematurely terminated test application. For instance, hanging of a test application or occurrence of a fatal error in deploying or running of a test application will not have a significant effect on other test applications running on the J2EE application server 102.

Although the embodiments of the present invention have been shown to shut down and restart the J2EE application server after deploying of each application, one having ordinary skill in the art should appreciate that in a different embodiment, the script may be written so as to shut down the application server after deploying or running any appropriate number of test applications (e.g., two (2), three (3), etc.).

FIGS. 3A-2 depict processing of a plurality of test applications 106a-106j, serially, respectively implementing exemplary scripts 110a'-1 through 110a'-10, in accordance with one embodiment of the present invention. As shown, the first test application 106a is shown to follow the script 110a-1 in which initially, the J2EE application server is shut down and restarted. Then, the first test application 106a is built, deployed into the J2EE application server, and run followed by generating of a report. As shown, a pass result entry for fully processed test application 106a is shown in the reports 116'a.

Thereafter, the J2EE application lifecycle manger 104 continues to process the subsequent test applications. In this example, the J2EE application lifecycle manager 104 uses the script 110a'-2 to process the second test application 106b. According to the second scenario, the J2EE application server is shut down and restarted. Followed by building of the second test application 106b, deploying the second test application 106b into the J2EE application server, and running the second test application 106b, and generating of a report. As shown, a pass result entry for fully processed test application 106b is shown in the reports 116'a. At this point, the J2EE application server is shut down and restarted again following the scenarios 110'a-3 through 110'a-10, while third test application 106c through tenth test application 106j are respectively processed, generating corresponding reports shown in reports 116'a.

As shown, the third test application 106c and the tenth test application 106j are shown to have been unsuccessfully processed, as demonstrated by the fail entries in reports 116'a. As can be appreciated, occurrence of a fatal error during processing of the third test application 106c, has not caused the reports 116'a to merely include fail results. As can be seen, the J2EE application lifecycle manger 104 has continued to process the next in lines test application. In this manner, processing of the test applications continues, serially, until the J2EE application lifecycle manager 104 reaches the last test application, the tenth test application 106j. Thus, using the exemplary scripts shown in 110'a-1 through 110'a-10, the J2EE application lifecycle manager 104 of the present invention is capable of limiting unwanted effects associated with improper and premature termination of a test application execution to that test application only. In this manner, occurrence of a fatal error during processing each test application will not have a significant effect on other test applications running on the J2EE application server 102.

FIGS. 3A-3 depicts processing of a plurality of test applications 106a-106j, serially, respectively implementing exemplary scripts 110"a-1 through 110"a-10, in accordance with one embodiment of the present invention. As shown, the first test application 106a is shown to follow the script 110"a-1 in which the first test application 106a is built, deployed into the J2EE application server, and run followed by generating of a report. As shown, a pass result entry for fully processed test application 106a is shown in the reports 116"a. At this point, the J2EE application server is shut down followed by restarting of the J2EE application server.

After restarting of the J2EE application server, the J2EE application lifecycle manger 104 continues to process the subsequent test applications. In this example, the J2EE application lifecycle manager 104 uses the script 110a"-2 to process the second test application 106b. According to the second scenario, second test application 106b is built, deployed into the J2EE application server, and run followed by generating of a report. As shown, a pass result entry for fully processed test application 106b is shown in the reports 116a". At this point, the J2EE application server is shut down again, followed by restarting of the J2EE application server. Following the scenarios 110a"-3 through 110a"-10, third test application 106c through tenth test application 106j are respectively processed, generating corresponding reports shown in reports 116"a.

As shown, the third test application 106c and the tenth test application 106j are shown to have been unsuccessfully processed, as demonstrated by the fail entries in reports 116"a. As can be appreciated, occurrence of a fatal error during processing of the third test application 106c, has not caused the reports 116"a to merely include fail results. As can be seen, the J2EE application lifecycle manger 104 has continued to process the next in lines test application. In this manner, processing of the test applications continues, serially, until the J2EE application lifecycle manager 104 reaches the last test application, the tenth test application 106j. Thus, using the exemplary scripts shown in 110"a-1 through 10a"-10, the J2EE application lifecycle manager 104 of the present invention is capable of limiting unwanted effects associated with improper and premature termination of a test application execution to that test application only. In this manner, occurrence of a fatal error during processing each test application will not have a significant effect on other test applications running on the J2EE application server 102.

Figures 1, 3B:
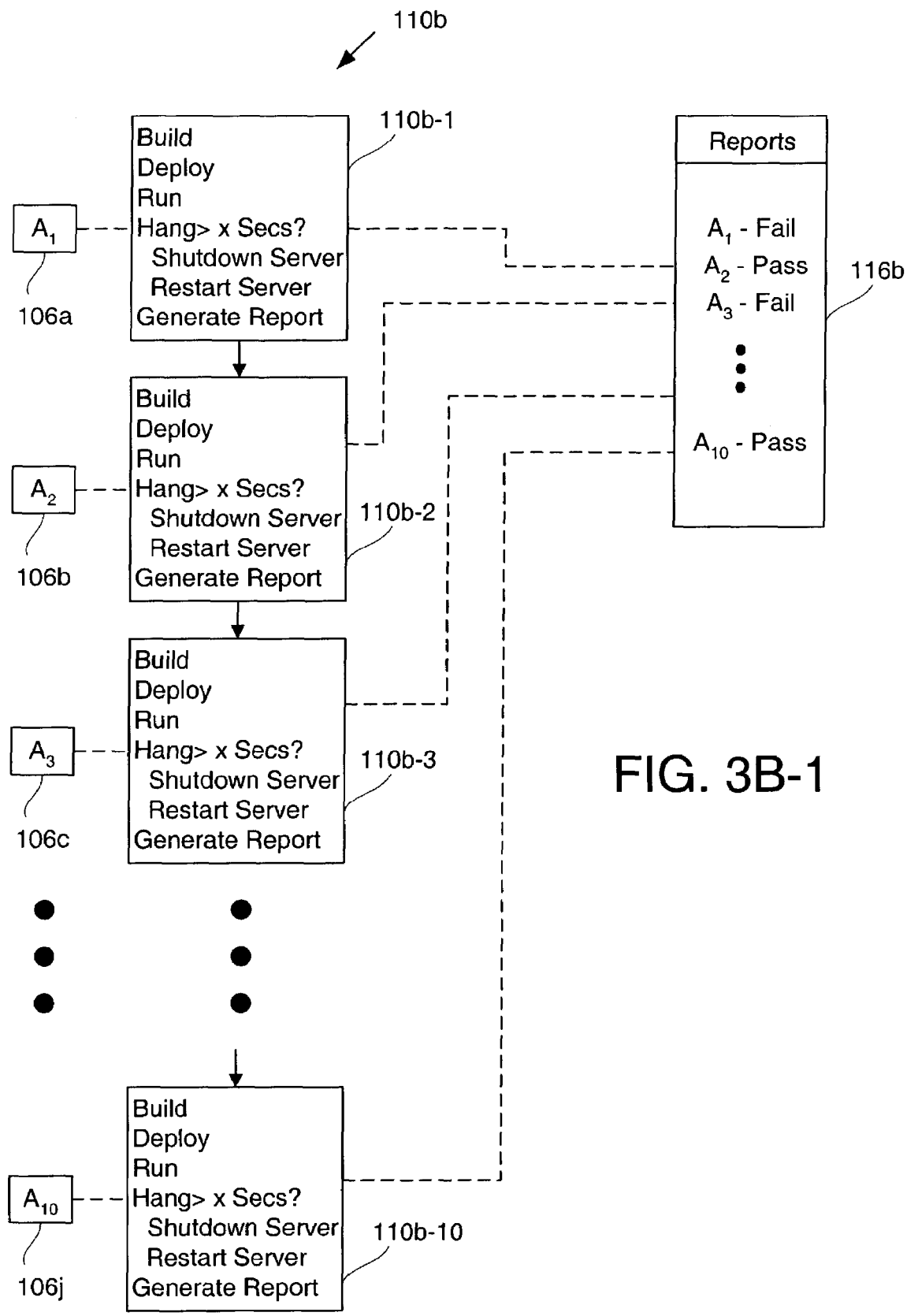
Figures 2, 3B:
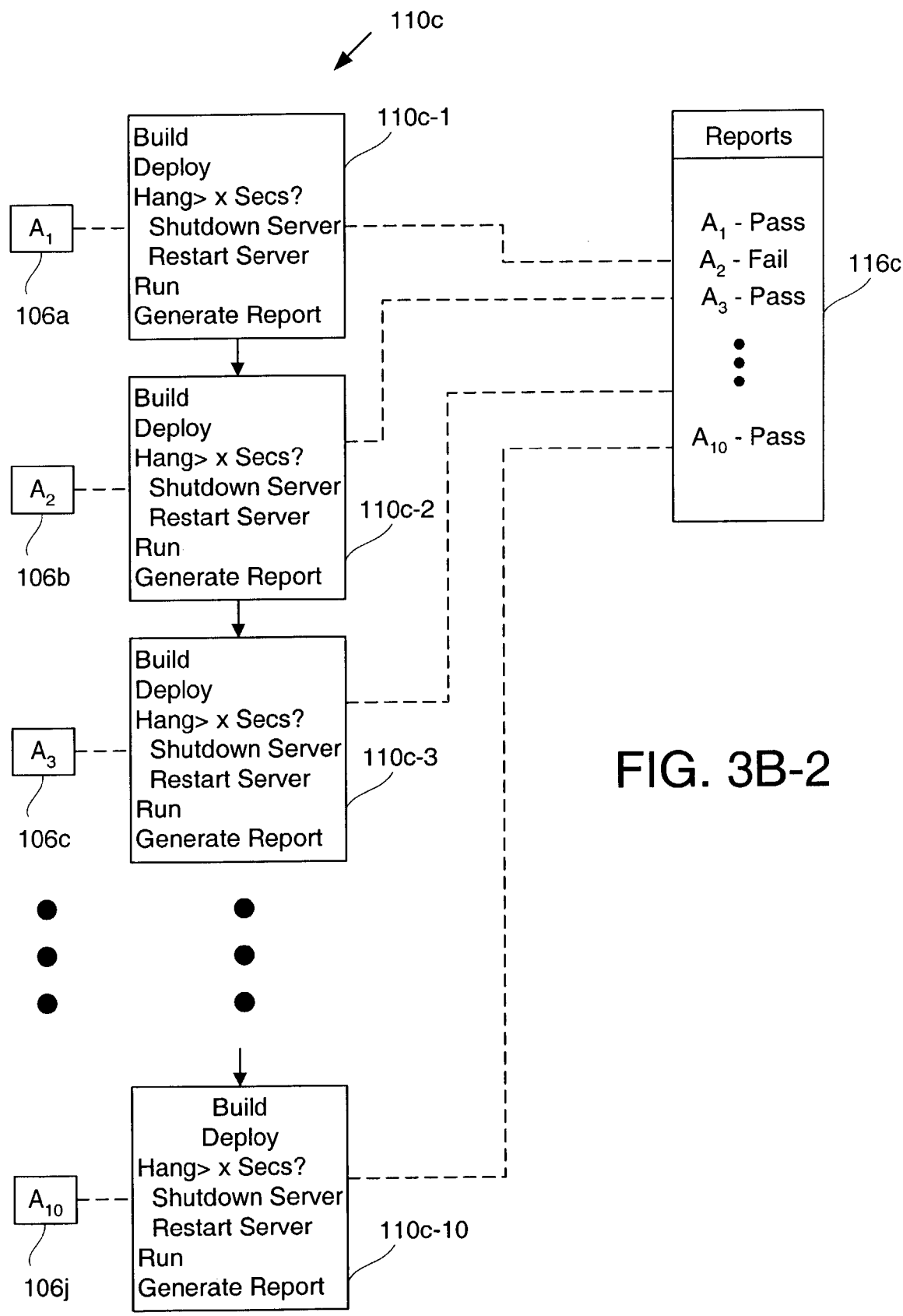

Reference is made to FIGS. 3B-1 illustrating in series processing of a plurality of test applications 106a-106j utilizing exemplary scripts 110b-1 through 110b-10, in accordance with one embodiment of the present invention. As shown, test applications 106a-106j are shown to be processed serially using the respective scripts 110b-1 through 110b-10. By way of example, the processing of the first test application 106a is initiated by building the test application 106a followed by deploying and running of the test application 106a. In one embodiment, while running the test application 106a, the J2EE application server 102 is shown to have hung for a period greater than X seconds. If such situation occurs, the J2EE application server 102 is shut down and restarted prior to generating a test report. As shown, the reports 116b includes a corresponding fail result entry for the test application 106a.

Next, the second test application 106b (the next in line test application) is processed using the script 110b-2. The second test application 106b is also built, deployed, and run. At this point, if it is determined that the J2EE application server 102 has hung for a period greater than X seconds, the script shuts down the J2EE application server 102. Since in the embodiment shown in FIGS. 3B-1 processing of the second test application 106b has not exceeded X seconds, processing of the second test application 106b is shown to have continued to generate a test report and the inclusion of the pass result entry in the reports 116b.

Next, the in series processing of the test applications is shown to have continued by processing the third test application 106c using the script 110b-3. At this junction, the third test application 106c is built, deployed, and run. However, a determination is made that execution of the third test application has exceeded the X-second limit. Upon making such determination, the J2EE application server 102 is shut down and restarted are followed by generating the test report and inclusion of the fail result entry in the reports 116b.

Thereafter, the next in line test applications are successively processed and each of their respective result entries is included in the reports 116b. The processing of test applications continues until the last test application is processed which in the embodiment of FIG. 3B, is the test application 106j. Ensuing the script 110b-10, the test application 106j is built, deployed, and run. As shown, the J2EE has not been shown to process the tenth test application 106j for greater than X seconds. Thus, processing the tenth test application concludes properly followed by test report generation and inclusion of the pass result entry in the reports 116b.

In this manner, the number of failed test applications is limited to those test applications that were fully processed but failed or were those which were terminated prematurely during processing due to occurrence of a fatal error associated with the J2EE application server, the test application, or the network. As a result, in contrast to the prior art, the embodiments of the present invention beneficially allow test applications designed to be executed subsequent to a failed test application to be processed to maturation so as to generate a pass/fail test result. In this manner, viewing and reviewing of the reports 116b provides developers a list that includes limited number of test applications failed during execution. This is in contrast to the prior art in which the list includes the failed test applications as well as all ancillary test applications configured to be processed subsequent to the failed test applications.

FIGS. 3B-2 illustrates in series processing of a plurality of test applications 106a-106J utilizing exemplary scripts 110c-1 through 110c-10, in accordance with one embodiment of the present invention. As shown, in the embodiment of FIGS. 3B-2, the scripts 110c-1 through 110c-10 determine whether the J2EE application server has hung for greater than X seconds after deploying of the respective test applications 106a through 106j. The first test application 106a is shown to be processed by building followed by deploying of the test application 106a. In one embodiment, a determination is made as to whether the J2EE application server 102 has hung for a period greater than X seconds while running the test application 106a. If such situation occurs, the J2EE application server 102 is shut down and restarted prior to generation of the test report. As shown, the execution of the first test application 106a did not extend greater than X seconds, thereby generation of the test report and inclusion of a corresponding pass result entry in the reports 116b.

Proceeding to execute the second test application 106b (the next in line test application), the second test application 106b is also built and deployed. At this point, the script 110c-2 shuts down the J2EE application server 102 upon determining that the J2EE application server 102 has hung for a period greater than X seconds while deploying the second test application 106b. As a result, the script follows to test report generation and inclusion of the corresponding fail test result in the reports 116c.

Next, the in-series processing of the test applications is shown to have continued by processing of the third test application 106c using the script 110c-3. At this junction, the third test application 106c is built and deployed. As shown, deploying of the third test application 106c has not exceeded the X-second limit. As such, the script 110c-3 continues to running the third test application 106c and generating the test report and inclusion of a pass result entry in the reports 116c.

Thereafter, subsequent test applications are successively processed and each respective result entry is included in the reports 116c. This continues until processing of the last test application (i.e., the tenth test application 106j) is concluded. Following the script 110c-10, the test application 106j is built and deployed. As shown, the J2EE application server has processed the tenth test application 106j within the X-second limit. Thus, processing of the tenth test application 106j concludes with generation of test report and inclusion of the pass result entry in the reports 116c.

It must be appreciated by one having ordinary skill in the art that the X-seconds implemented as the determinative length of time, the script may be written such that the application server is shut after any appropriate length of time. In this manner, the embodiments of the present invention may implement different parameters, which in implementation depends on a type of the application, process the test applications.

Figure 4A:
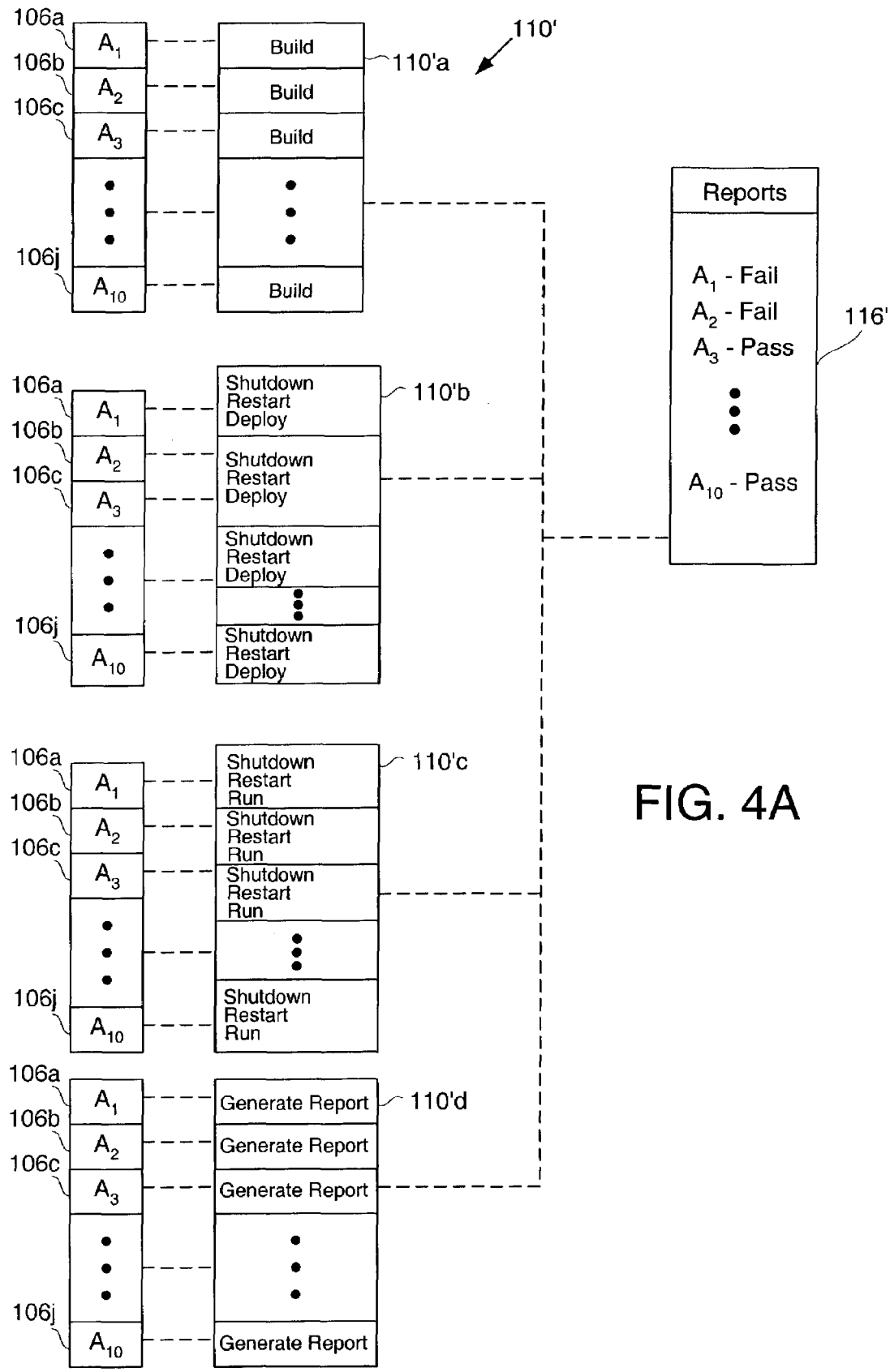
FIG. 4A is a block diagram illustrating in parallel processing of a plurality of test applications utilizing an exemplary script, in accordance to yet another embodiment of the present invention.
Figure 4B:
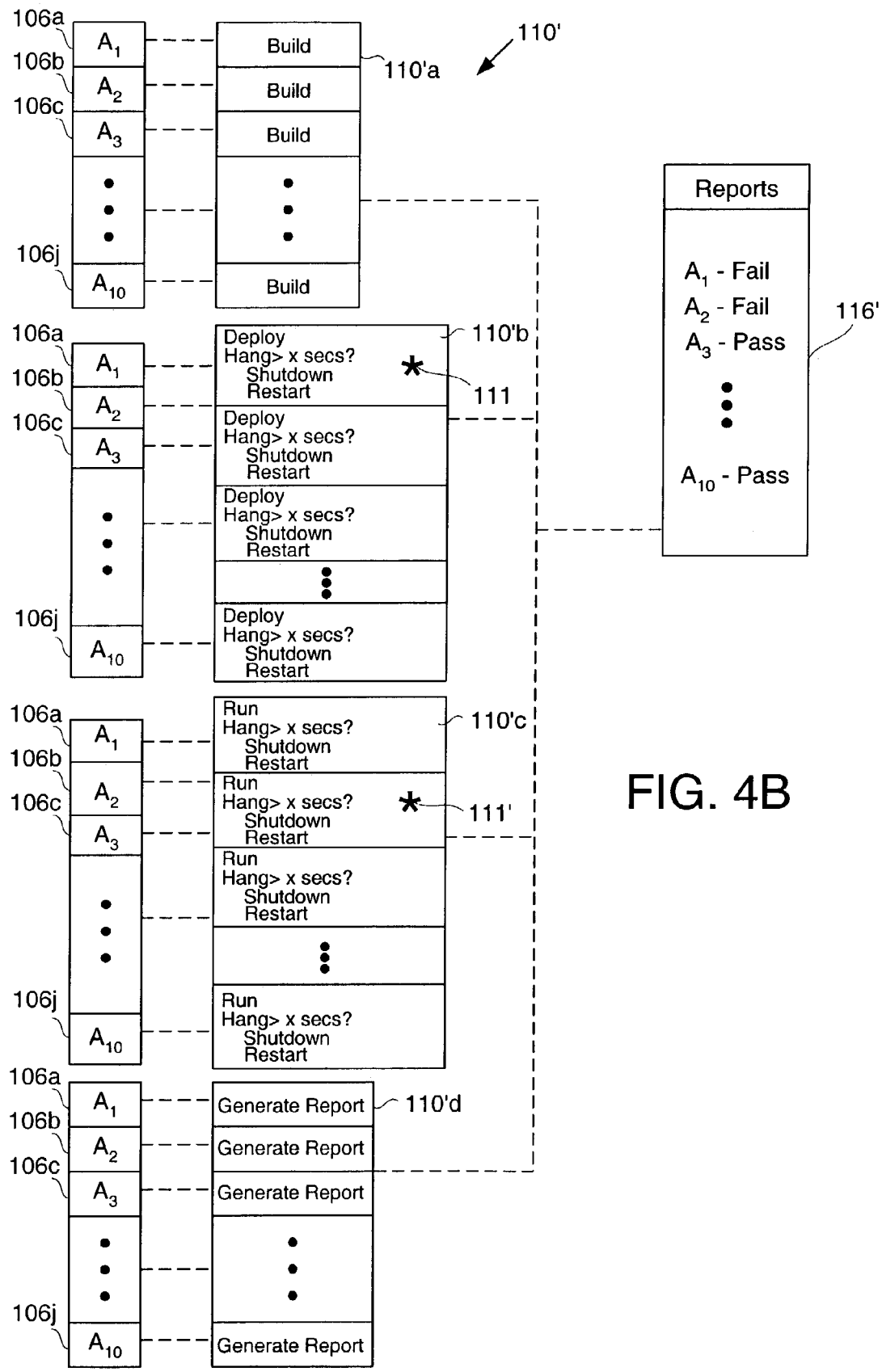
FIG. 4B is a block diagram illustrating in parallel processing of a plurality of test applications utilizing an exemplary script, in accordance to yet another embodiment of the present invention.

Reference is made to FIGS. 4A and 4B illustrating in parallel processing of a plurality of test applications 106a-106j utilizing exemplary scripts 110'a through 110'd, in accordance with one embodiment of the present invention. In the example shown in FIG. 4A, test applications 106a-106j are built in parallel using the script 110'a followed by deploying of all test applications 106a-106j using the script 110'b. As shown, prior to deploying each test application 106a through 106j, the application server is shown to be shut down and restarted. Thereafter, all test applications 106a-106j are run using the script 110'c followed by generating a respective test report using the script 110'd. As illustrated, prior to running each test application 106a through 106j, the application server 102 is shut down and restarted.

Comparatively, in the embodiment shown in FIG. 4B, after each test application 106a-106j is deployed, a determination is made as to whether the application server 102 has hung greater than 40 seconds during the processing of the test application 106a-106j. If such determination is made, the application server 102 is shut down and restarted prior to deploying the next test application. In a like manner, after each test application is run, a determination is made as to whether the application server 102 has hung greater than 40 seconds while running the test application. If such determination is made, the application server is shut down and restarted prior to running the next test application.

In one implementation, a plurality of threads is used to process all the test cases in parallel. However, in a different embodiment, any suitable structure may be implemented to enable in parallel processing of the test cases (e.g., time interval, all threads running simultaneously, creating a plurality of threads simultaneously and running the treads one at a time, etc.).

In the embodiment of FIG. 4A, all the test applications 106a-106j are shown to have been successfully built and deployed. However, in FIG. 4B, all the test cases 106a-106j have not been successfully deployed or run. Deployment of the test case 106a was prematurely terminated due to an error (e.g., the application server 102 being hung for greater than 40 seconds), as marked by the asterisk 111. As a result, processing of the test case 106a was terminated prematurely followed by generation of the test report generation and inclusion of the respective fail result entry in the reports 116'.

In a like manner, running the second test case 106b is terminated prematurely due to an error, as marked by the asterisk 111'. As a consequence, the reports 116' also includes a fail result entry for the second test case 106b. The reports 116' however, includes pass result entries for all the remaining test cases. In one embodiment, the test cases 106a and 106b may have failed due to an error in the network connections or the respective test applications 106a and 106b.

Thus, contrary to the prior art, prematurely terminating execution of a test case being processed, in parallel, with a plurality of test cases, does not result in global premature termination of all the test cases. Rather, the reports 116' includes fail result entries only for failed test cases, as opposed to including fail result entries for all test cases being processed in parallel, as performed by the prior art.

Figure 5A:
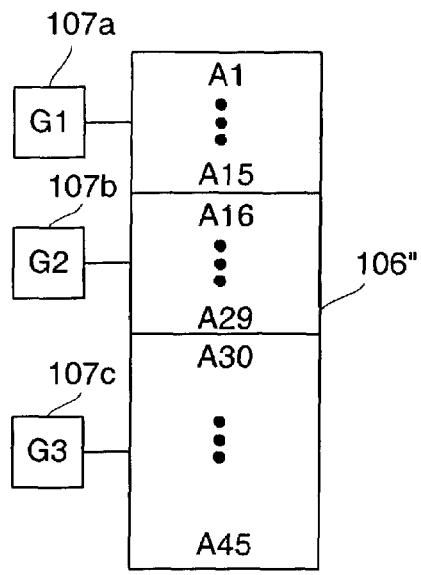
FIG. 5A depicts a plurality of test cases having been assembled into a plurality of groups for execution by a plurality of distributed application servers, in accordance with yet another embodiment of the present invention.
Figure 5B:
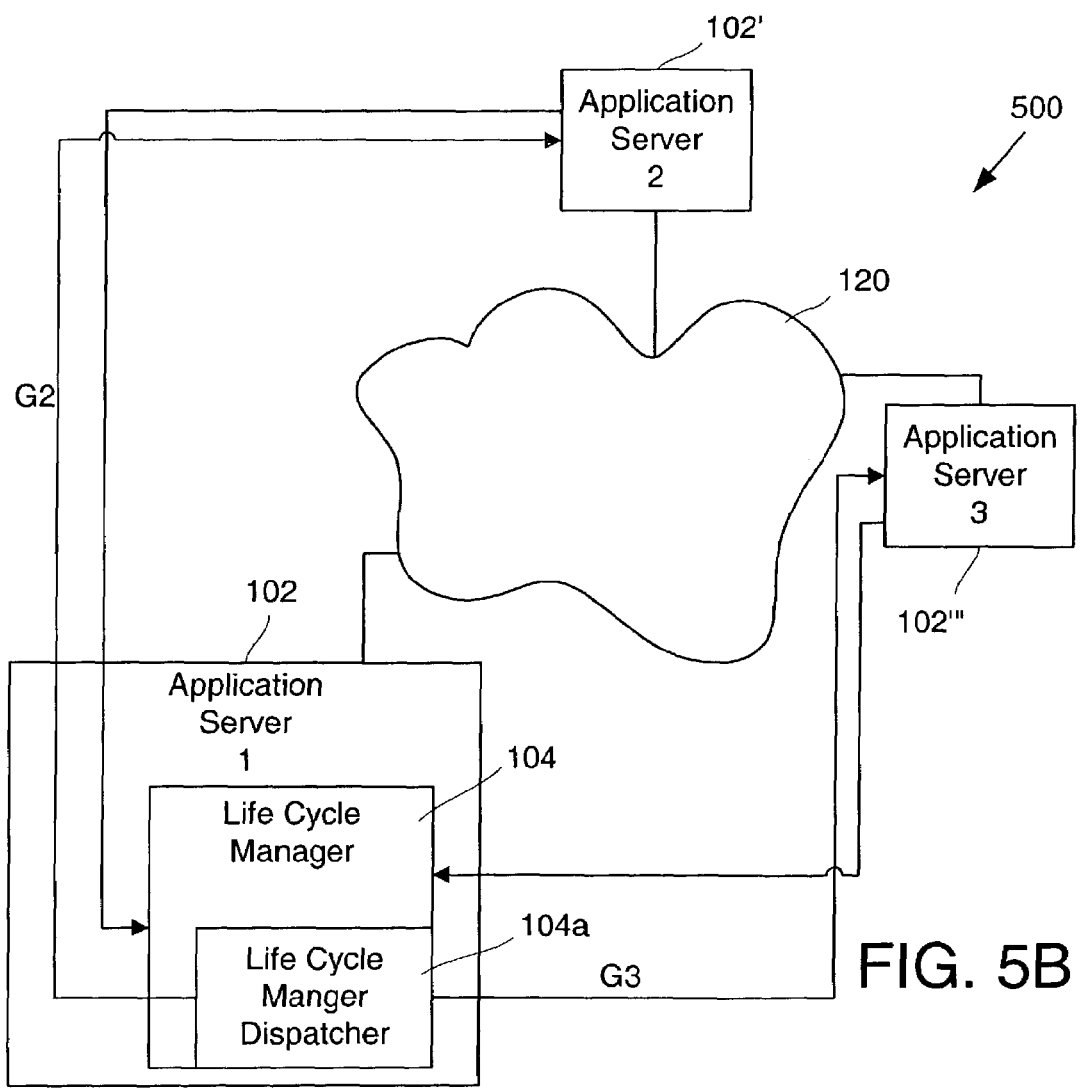
FIG. 5B depicts distributed processing of groups of test cases by a plurality of distributed application servers, in accordance with yet another embodiment of the present invention.

Reference is made to simplified block diagrams of FIGS. 5A and 5B illustrating distributed processing of groups of test cases by a plurality of distributed application servers, in accordance with one embodiment of the present invention. As shown, in one example, the plurality of test cases A1 through A45 has been assembled into a plurality of groups 107a-107c. Test cases A1-A15 are shown to form the group 107a, test cases A16-A29 are shown to have makeup the group 107b, and test cases A30-A45 are shown to form the group 107c.

In accordance with one embodiment, the test cases 106" can be processed by a plurality of distributed application servers 102, 120', and 102" connected via a network 120. By way of example, the application server 102 is configured to be a main application server as the application server 102 includes the application server lifecycle manager 104. In one instance, an application server lifecycle manager dispatcher 104a defined in the application server lifecycle manager 104 is configured to distribute groups 107a-107c to the application servers 102, 102', and 102".

In the embodiment of FIG. 5B, the application server lifecycle manager dispatcher 104a is shown to have dispatched the group 107b to the application server 102' and the group 107c to the application server 102". Thus, the group 107a is maintained by the application server 102 for processing. After running the test applications in groups 107b and 107c has concluded, the test reports generated for each group is communicated to the lifecycle manager 104. In this manner, groups 107a-c can implement similar or diverse scripts.

Figure 6:
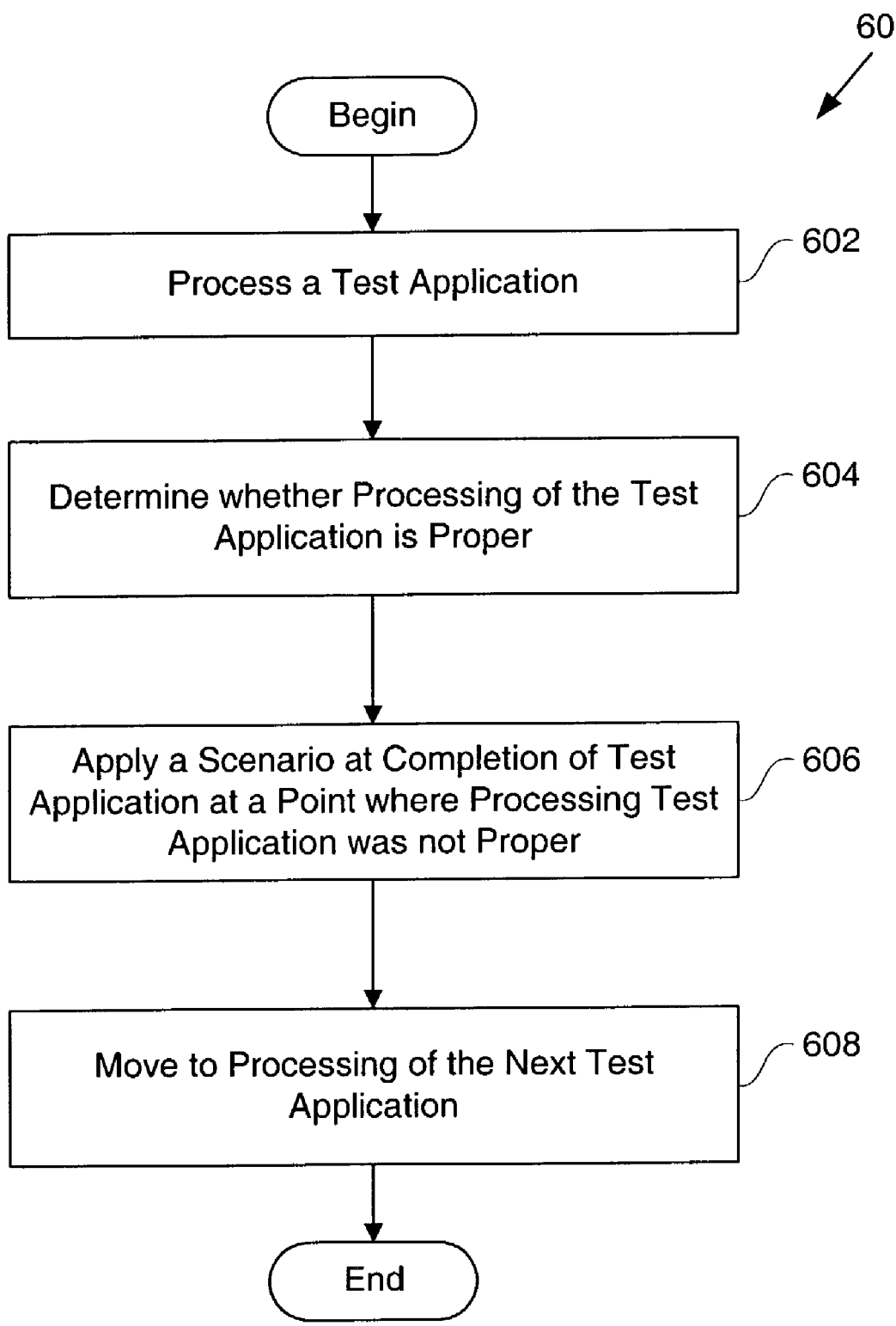
FIG. 6 is a flow chart diagram illustrating a method operations performed by an exemplary application server lifecycle manger, in accordance with yet another embodiment of the present invention.

FIG. 6 is a flow chart diagram 600 of a method operations performed by an exemplary application server lifecycle manger, in accordance with one embodiment of the present invention. The method begins in operation 602 in which a test application is processed followed by operation 604 in which a determination is made as to whether processing the test application was proper. Next, in operation 606, a scenario is applied at the completion of the test case or at a point where processing of the test case was not proper. Then, in operation 608, the method moves to process the next test application.

In one embodiment, an exemplary script is used to shut down and restart the application server prior to deploying the test application into the application server. In another implementation, another exemplary script is used to shut down and restart the application server upon detecting a specific status of the application server. In this manner, the present invention has the capability to limit the unwanted effects associated with improper and premature termination of a test application to that specific test application only. As a consequence, failure of a test application has no significant effect on processing test applications configured to be processed concurrently or subsequent to the terminated test application.

Figure 7:
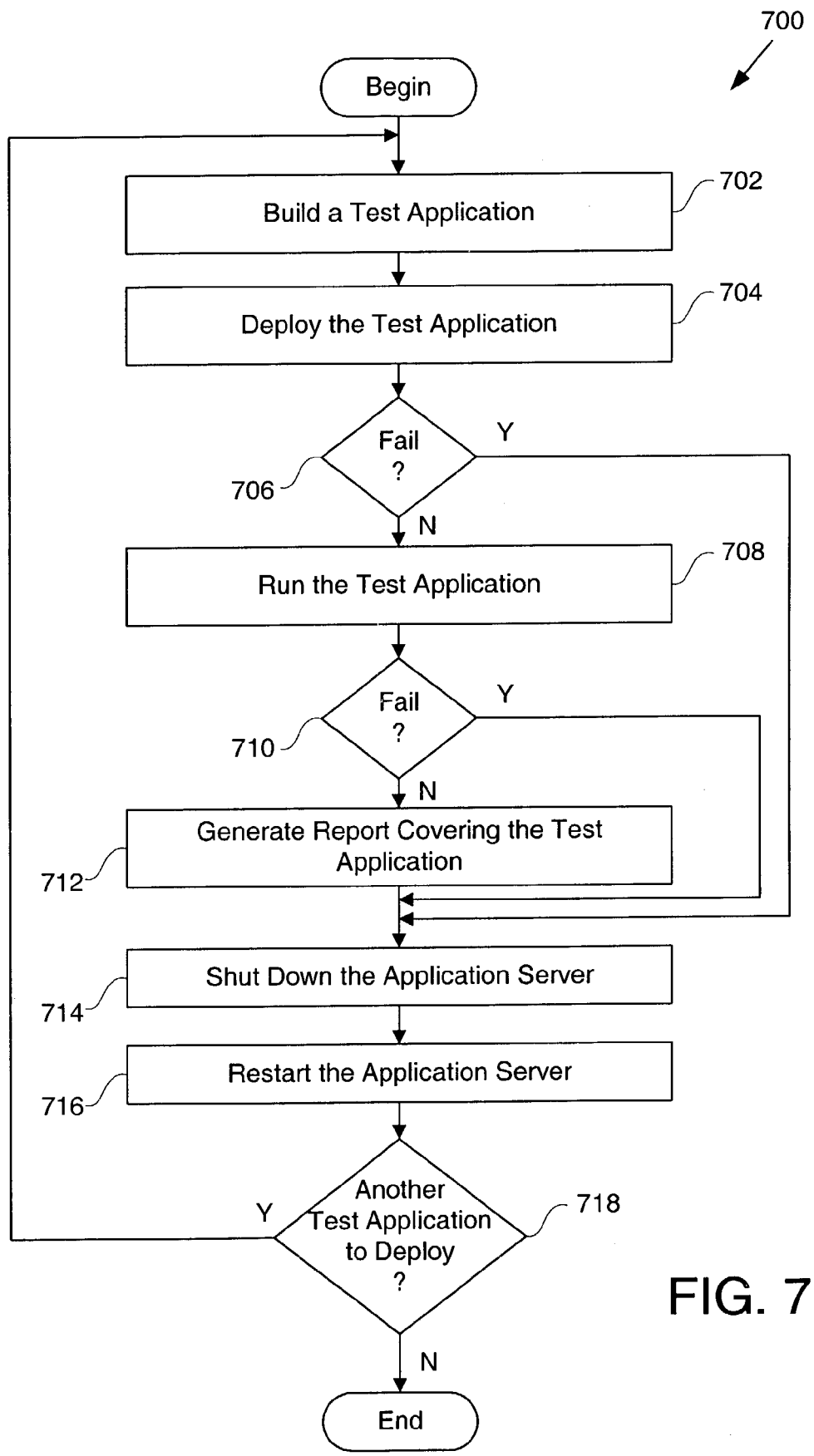
FIG. 7 is a flow chart diagram illustrating a method operations implemented by an exemplary application server lifecycle manger applying a scenario, in accordance with yet another embodiment of the present invention.

Turning to FIG. 7, a flow chart diagram 700 illustrating a method operations performed by an exemplary application server lifecycle manger applying a scenario is provided, in accordance with one embodiment of the present invention. The method begins in operation 702 in which a test application is built followed by operation 704 in which the test application is deployed. In operation 706 a determination is made as to whether the operation of deploying the test application has failed. If it is determined that deploying the test application was performed properly, the method continues to operation 708 in which the test application is run. The method next proceeds to operation 710 in which a decision is made as to whether the operation of running the test application has failed. If running the test application did not fail, the method continues to operation 712 in which the test report covering the test application is generated.

Thereafter, the method continues to operation 714 in which the application server is shut down followed by the operation 716 in which the application server is restarted. Next, a determination is made as to whether there exists another test application to be deployed into the application server. If another test application to be deployed exists, the method continues to operation 702, in which the test application is built.

If in operation 706 a determination is made that deploying of the test application has failed, or that in operation 710 a determination is made that the operation of running the test application has failed, the method continues to operation 714 in which the application server is shut down. Thereafter, in operation 716 the application server is restarted. Next, a determination is made as to whether there exists another test application to be deployed into the application server. If another test application to be deployed exists, the method continues to operation 702, in which the test application is built.

Figure 8:
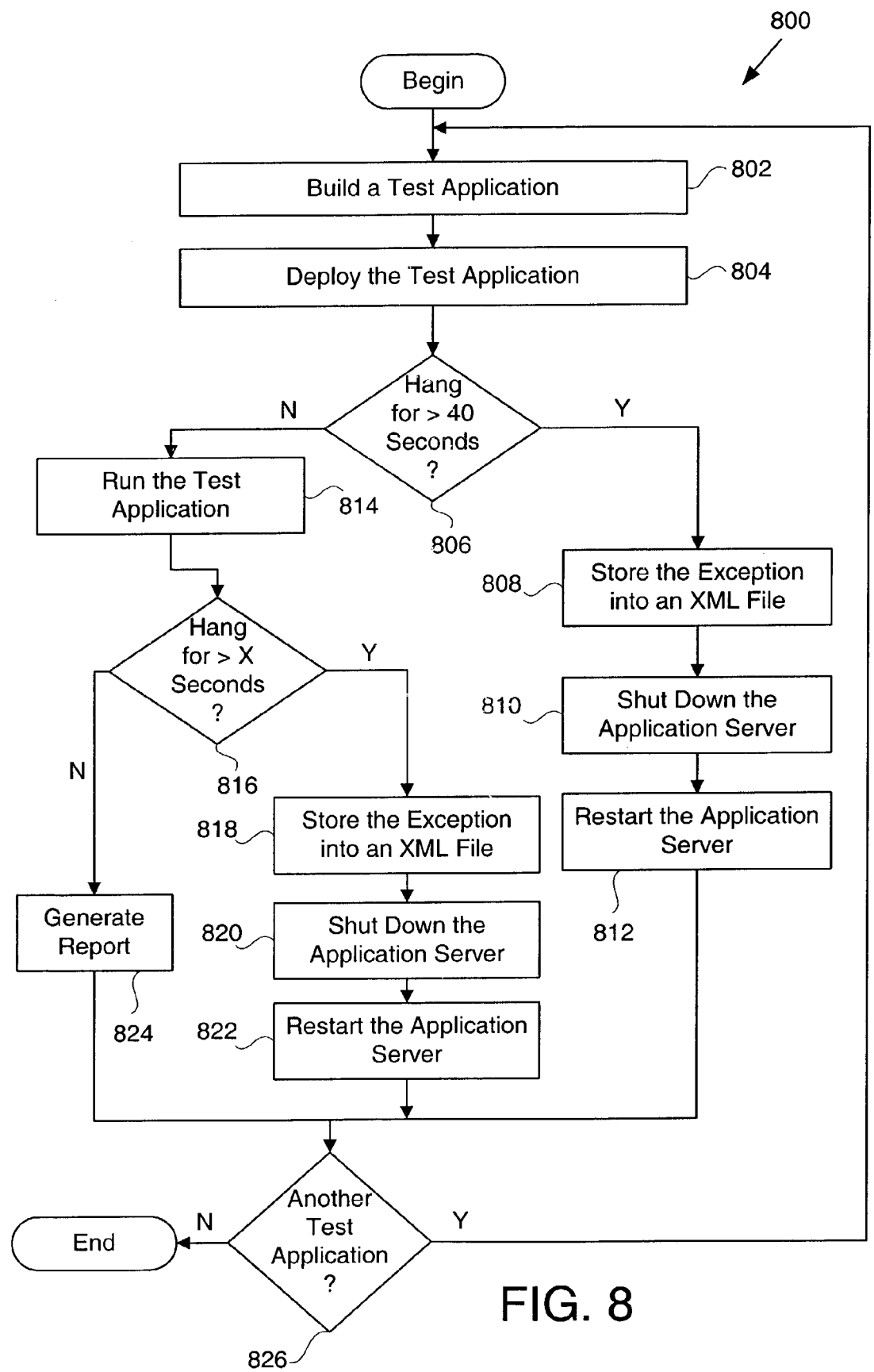
FIG. 8 is a flow chart diagram illustrating a method operations implemented by an exemplary application server lifecycle manger applying a different scenario, in accordance with yet another embodiment of the present invention.

Reference is made to a flow chart diagram 800 of FIG. 8, depicting a method operations performed by an exemplary application server lifecycle manger applying another scenario, in accordance with one embodiment of the present invention. The method begins in operation 802 in which a test application is built followed by operation 804 in which the test application is deployed. Next, in operation 806, a determination is made as to whether the application server processing the test application has hung for greater than 40 seconds.

When the application server has hung for more than 40 seconds during deploying of the test application, the method continues to operation 808 in which an exception is stored into an XML file reflecting hanging of the application server. Then, the application server is shut down in operation 810 and then restarted in operation 812. The method next continues to operation 826 in which a determination is made as to whether there exists another test application to be processed. If another test application awaits processing, the method continues to operation 802 in which the test application is built.

If in operation 806 it is determined that the application server has not hung for greater than 40 seconds, the method continues to operation 814 in which the test application is run. Next, in operation 816 a decision is made as to whether the application server has hung for greater than 40 seconds while running the test application. If the application server has not hung for greater than 40 seconds, the method continues to operation 824 in which a test report is generated followed by operation 826 in which it is determined whether there exists another test application to be processed. If there is another test application to be processed, the method continues to operation 802 in which the test application is built.

However, if in operation 816 a determination is made that the application server has hung for greater than 40 seconds while running the test case, the method continues to operation 818 in which an exception is stored into an XML file. Thereafter, the application server is shut down and restarted in operations 820 and 822, respectively. Thereafter, the method continues to operation 826.

The advantages of the present invention are numerous. Most importantly, in contrast to the prior art, the embodiments of the present invention limit the list of failed test applications to those test applications that were fully processed and failed or those test applications, which have failed due to being prematurely terminated. Another advantage of the embodiments of the present invention is generating results having high accuracy. Yet another advantage of the embodiments of the present invention is the reliability and availability of the system.

With the above embodiments in mind, it should be understood that, the invention may be practiced with other computer system configurations including hand-held devices, microprocessor systems, microprocessor-based or programmable consumer electronics, minicomputers, mainframe computers and the like. Furthermore, the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion. Furthermore, although the present invention implements Java programming language, other programming languages may be used to implement the embodiments of the present invention (e.g., C, $C_{++}$, any object oriented programming language, etc.).

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for using an application lifecycle manager to manage an application server that is configured to execute a plurality of test applications, comprising:

processing each of the plurality of test applications, each of the plurality of test applications having a respective test script for running the corresponding test application;

determining if any of the plurality of applications fails to be processed to completion;

recording an exception identifying an explanation for the failure for any application that fails to be processed;

allowing the processing of the remaining respective test scripts to continue to completion to prevent premature termination of the processing when one of the plurality of test applications fails to be processed; and shutting down and restarting the application server when prompted by the application lifecycle manager in response to processing.

2. The method as recited in claim 1, wherein processing each of the plurality of test applications to completion further includes building each of the plurality of test applications by building the respective test script associated with each of the plurality of test applications;

deploying the respective test script associated with each of the plurality of test applications;

running the respective test script associated with each of the plurality of test applications; and generating a test report for each of the plurality of test applications.

3. The method as recited in claim 1, wherein recording further includes storing the exception as data in a file.

4. The method as recited in claim 1, wherein recording further includes storing the exception as Extensible Markup Language (XML) to a file.

5. The method as recited in claim 1, wherein recording further includes storing to a file the exception as Extensible Markup Language (XML) configured to be viewed using Extensible Stylesheet Language (XSLT).

6. The method as recited in claim 1 wherein processing further includes sequentially processing each of the plurality of test applications and determining further includes sequentially determining if each of the plurality of applications fails to be processed to completion; shutting down and restarting the application server further includes shutting down and restarting the application server after a predetermined number of the plurality of test applications have been processed and before remaining test applications of the plurality of test applications have been processed.

7. A method for using an application lifecycle manager to manage an application server that is configured to execute a plurality of test applications, comprising:
    processing each of the plurality of test applications, each of the plurality of test applications having a respective test script for running the corresponding test application;
    determining if any of the plurality of test applications fails to be processed to completion for a predetermined period of time;
    shutting down and restarting the application server in response to one of the plurality of test applications failing to be processed to completion;
    recording, before shutting down and restarting the application server, an exception identifying an explanation for the failure of the one of the plurality of test applications failing to be processed to completion;
    allowing the processing of the respective test scripts to completion to prevent premature termination of the processing when one of the plurality of test applications fails to be processed.

8. The method as recited in claim 7, wherein processing each of the plurality of test applications to completion further includes
    building each of the plurality of test applications by building the respective test script associated with each of the plurality of test applications;
    deploying the respective test script associated with each of the plurality of test applications;
    running the respective test script associated with each of the plurality of test applications; and
    generating a test report for each of the plurality of test applications.

9. The method as recited in claim 7, wherein the application server is an enterprise application server.

10. The method as recited in claim 7, wherein the exception identifying the explanation for the failure is stored to a file.

11. The method as recited in claim 10 wherein the file has an Extensible Markup Language (XML) configuration.

12. The method as recited in claim 7 wherein processing further includes sequentially processing each of the plurality of test applications and determining further includes sequentially determining if each of the plurality of applications fails to be processed to completion; shutting down and restarting the application server further includes shutting down and restarting the application server after a predetermined number of the plurality of test applications have been processed and before remaining test applications of the plurality of test applications have been processed.

13. A method for using an application lifecycle manager to manage an application server that is configured to execute a plurality of test applications, comprising:
    shutting down and restarting the application server when prompted by the application lifecycle manager;
    processing a first one of the plurality of test applications wherein each of the plurality of test applications having a respective test script for running the corresponding test application;
    recording a pass explanation if the processing of the first one of the plurality of test applications proceeds to completion;
    recording a fail explanation if the processing of the first one of the plurality of test applications fails to proceed to completion; and
    allowing the processing of the respective test scripts to continue to completion to prevent premature termination of the processing when the first one of the plurality of test applications fails to be processed.

14. The method as recited in claim 13, wherein processing a first one of the plurality of test application, includes
    building the first one of the plurality of test applications by building the respective test script associated with the first one of the plurality of test applications;
    deploying the respective test script associated with the first one of the plurality of test applications;
    running the respective test script associated with the first one of the plurality of test applications; and
    generating a test report for the first one of the plurality of test applications.

15. A method for using an application lifecycle manager to manage an application server that is configured to execute a plurality of test applications, comprising:
    processing each of the plurality of test applications, sequentially, each of the plurality of test applications having a respective test script for running the corresponding test application;
    for each of the plurality of test applications identifying results of processing of each of the plurality of test applications, with said results being one of a set of results consisting of a pass condition and a fail condition, with said fail condition further including an explanation of said fail condition;
    recording said results;
    allowing the processing of the respective test scripts to continue to completion to prevent premature termination of the processing when one of the plurality of applications fails to be processed; and shutting down and restarting the application server in response to identifying.

16. The method as recited in claim 15 further wherein shutting down and restarting occurs in response to identifying the fail condition for one of said plurality of test applications and before processing the remaining test applications of said plurality of test applications.

17. The method as recited in claim 15 further wherein shutting down and restarting occurs in response to identifying the fail condition for one of said plurality of test applications and before processing the remaining test applications of said plurality of test applications, with recording the fail condition for said one of said plurality of test applications occurring after shutting down and restarting.

18. The method as recited in claim 15 wherein shutting down and restarting occurs after recording results for each of said plurality of test applications.

19. A method for using an application lifecycle manager to manage an application server that is configured to execute a plurality of test applications in parallel, comprising:

building a plurality of test applications in parallel, each of the plurality of test applications having a respective test script for running the corresponding test application;

deploying the respective test script associated with the plurality of test applications in parallel;

recording an exception, if a test application of the plurality of test applications fails to deploy successfully;

allowing the processing of the respective test scripts to continue to completion to prevent premature termination of the processing when one of the plurality of test applications fails to be processed;

shutting down the application server when prompted by the application lifecycle manager;

restarting the application server when prompted by the application lifecycle manager; and running the respective test script associated with the plurality of test applications in parallel, with shutting down and restarting being in response to a predetermined event occurring while running the plurality of test applications in parallel.

20. The method as recited in claim 19, wherein the application server is an enterprise application server.

* * * * *